April 25, 1939.  W. H. THURSTON  2,155,809
SAW GRINDING MACHINE
Filed Jan. 4, 1937   3 Sheets-Sheet 1
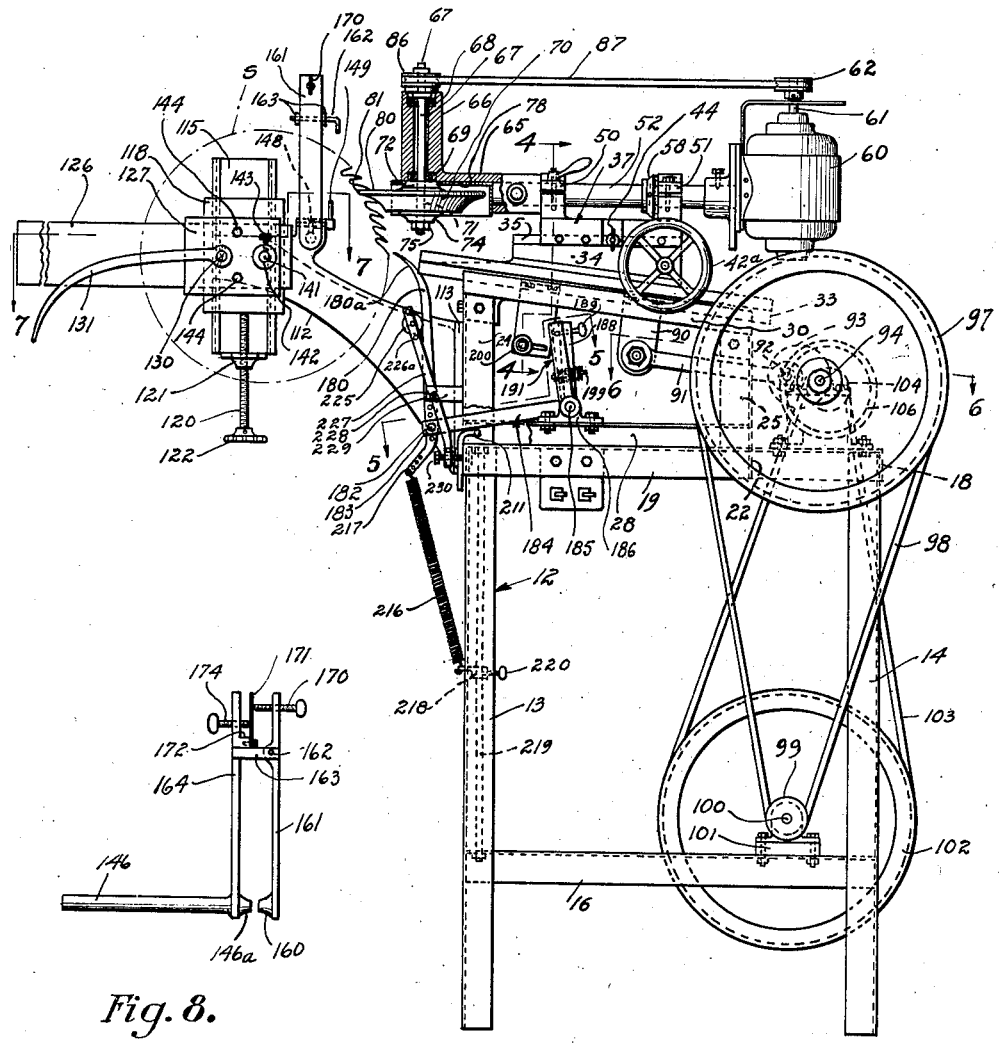
Fig. 1.
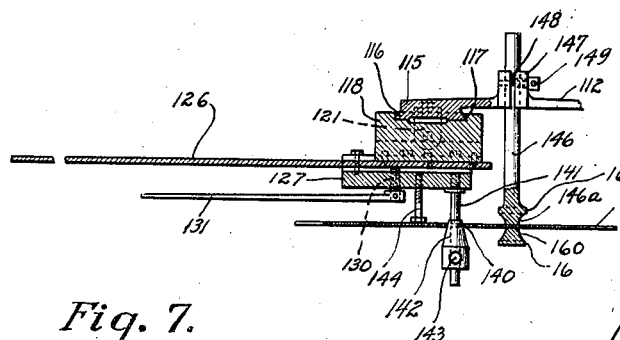
Fig. 8.
Fig. 7.
Inventor.
Willard H. Thurston.
Attorney.

April 25, 1939.  W. H. THURSTON  2,155,809
SAW GRINDING MACHINE
Filed Jan. 4, 1937  3 Sheets-Sheet 2

Inventor.
Willard H. Thurston.

Attorney.

April 25, 1939.  W. H. THURSTON  2,155,809
SAW GRINDING MACHINE
Filed Jan. 4, 1937   3 Sheets—Sheet 3

Inventor.
Willard H. Thurston.
Attorney.

Patented Apr. 25, 1939

2,155,809

UNITED STATES PATENT OFFICE 2,155,809

SAW GRINDING MACHINE

Willard H. Thurston, Los Angeles, Calif.

Application January 4, 1937, Serial No. 118,974

4 Claims. (Cl. 76—32)

This invention relates generally to grinding machines for circular saws, and more particularly to machines for grinding and sharpening circular saws of different diameters and tooth sizes and shapes.

Saw grinding machines as heretofore known have not been capable of grinding the teeth of a circular saw with a high degree of accuracy. Cams and gears are frequently employed in the movement of the grinding wheel toward and from the saw, and such cams and gears are subject to substantial wear, with resultant inaccuracy in the movement of the grinding wheel. Further difficulty has been encountered in the provision of means for intermittently advancing the saw through the exact distance desired with a high degree of accuracy. Insofar as I am aware, no saw grinding machine capable of grinding the teeth of a circular saw with a high degree of uniformity and accuracy, or which is not subject to rapid wear with resulting rapidly increasing inaccuracy in the doing of its work, has heretofore been known.

It is accordingly a primary object of the present invention to provide a precision saw grinding machine, capable of grinding a circular saw with a high degree of accuracy and uniformity from tooth to tooth, and which, in addition, is not subject to rapidly increasing inaccuracy in normal service.

It is a further object of the invention to provide a circular saw grinding machine in which normal wear may be readily compensated by adjustment, and whose precision therefore does not suffer even as wear occurs.

Another object of the invention is to provide a circular saw grinding machine which is readily adjustable to circular saws of different diameters, tooth sizes, and tooth shapes and angles.

A still further object of the invention is to provide a circular saw grinding machine in which the grinding wheel advances into engagement with the tooth to be ground in such a manner as to avoid all liability of damage to the point of the tooth.

The saw grinding machine provided by the present invention is characterized by extreme accuracy in the movement of parts, and the avoidance of machine elements which are likely to introduce looseness or lack of precision in the motion of the operative members of the machine.

It is a feature of importance in my invention that the effect of what wear does occur in the parts involved in advancing the grinding wheel into engagement with the saw has no effect on the accuracy of the machine, the effects of any such wear being cancelled out in the normal adjustment of the machine to suit a given saw to be ground.

Another feature of the invention is that the saw advancing means embodies a member which engages and advances always the tooth which has just been ground, advancing to the tooth just after the grinding wheel has been backed away, and by acting on a ground tooth rather than on an unground tooth, this member advances the saw with greater accuracy than would otherwise be possible.

The invention will be most readily understood by referring now to the following detailed description of a present specific embodiment thereof, reference for this purpose being had to the accompanying drawings, in which:

Fig. 1 is a side elevation of the machine showing the grinding wheel in grinding engagement with a circular saw;

Fig. 7 is a section taken as indicated by line 7—7 of Fig. 1;

Fig. 8 is an enlarged detail taken from Fig. 3;

Figure 2:
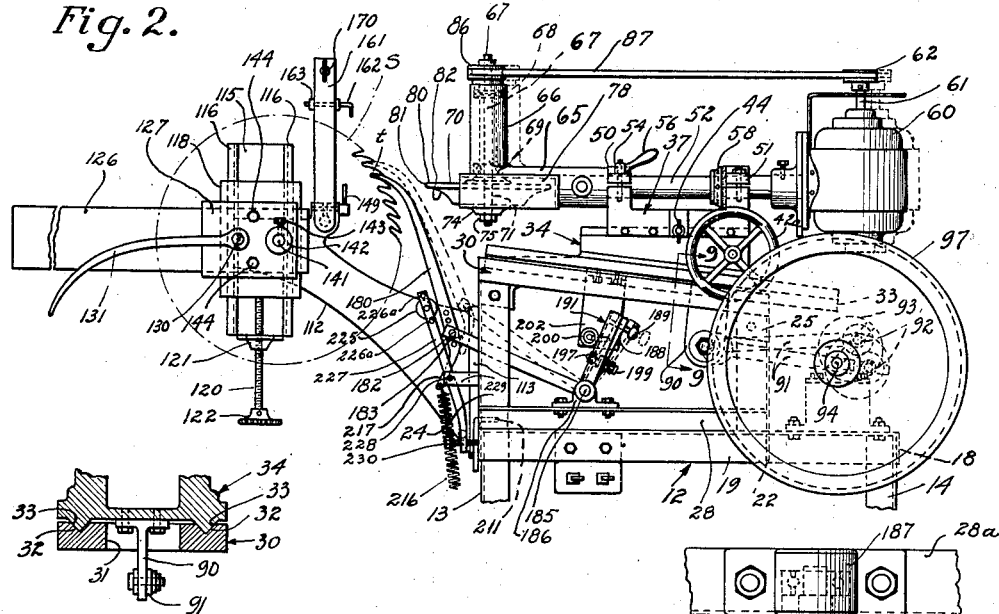
Fig. 2 is a view of the upper portion of the machine, showing the grinding wheel and its carriage in the course of its retractive movement from the saw, and showing the saw advancing pawl in a position just in engagement with the saw tooth which has just been ground, preparatory to advancing the saw.

The illustrative machine shown in the drawings is provided with a frame 12 embodying front legs 13 and rear legs 14, which are connected near their lower ends by suitable bracing members 15 and 16, and at the top by end members 17 and 18 and side members 19 and 20. These frame members may be rigidly connected together in any suitable manner, as by welding, or the frame may be made as one integral casting.

The frame of the machine also includes a horizontal member 22 extending between side frame members 19 and 20, and extending upwardly from front end frame member 17 and from member 22 are four upright members 23, 24, 25 and 26, members 23 and 24 at the forward end of the machine being longer than rearward members 25 and 26. Upright members 24 and 25 are braced by a longitudinal frame member 28 welded in place on frame members 17 and 22 and engaging the sides of members 24 and 25, and upright members 23 and 26 are braced by a similar longitudinal frame member 28a.

Figures 4, 5, 9:
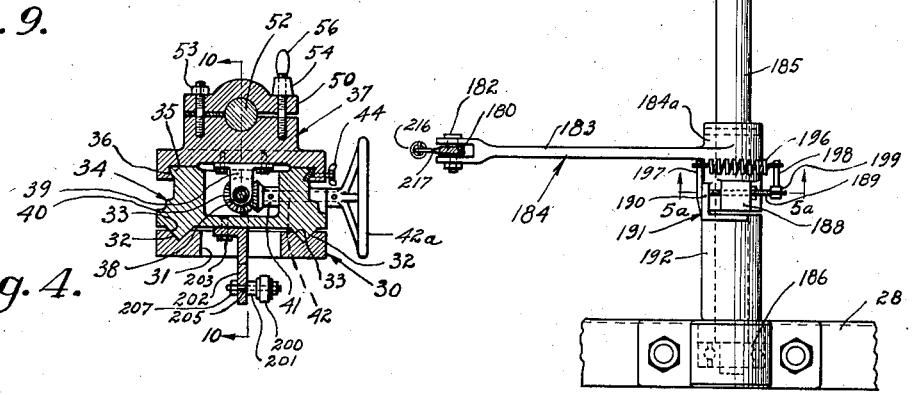
Fig. 4 is a section taken on broken line 4—4 of Fig. 1.
Fig. 5 is a view taken as indicated by line 5—5 of Fig. 1.
Fig. 9 is a detail on line 9—9 of Fig. 2.
Figures 5A, 6:
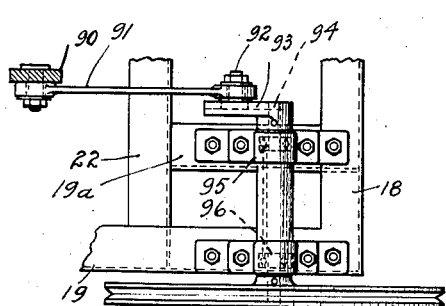
Fig. 5a is a section taken on line 5a—5a of Fig. 5.
Fig. 6 is a view taken as indicated by line 6—6 of Fig. 1.
Figures 3, 10:
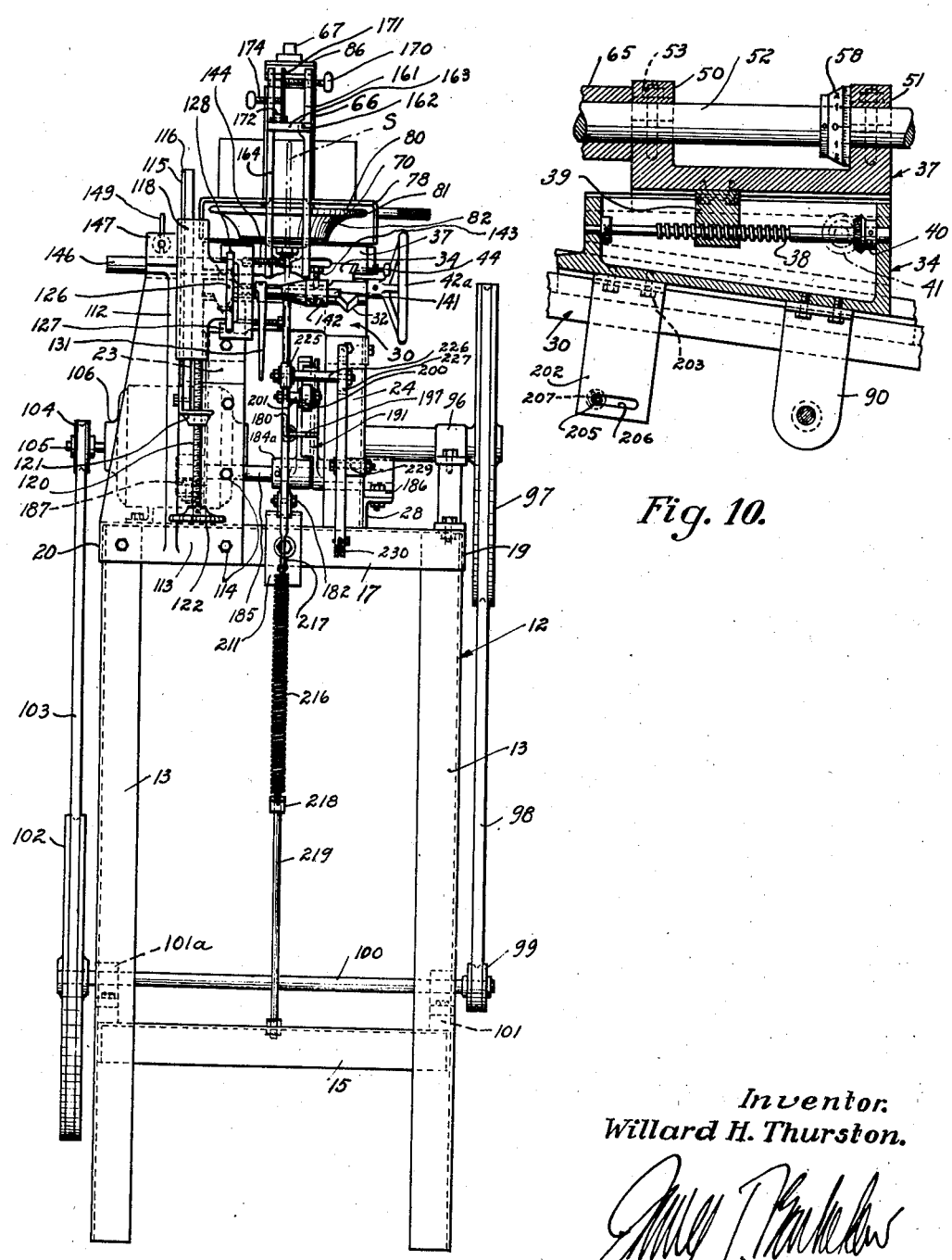
Fig. 3 is an end elevation of the machine shown in Fig. 1, being a view looking toward the machine from the left in Fig. 1.
Fig. 10 is a section taken as indicated by line 10—10 of Fig. 4.

Mounted on the upper ends of uprights 23, 24, 25 and 26 is an inclined bed plate 30, which is provided with a central longitudinally extending opening 31, as shown in Fig. 4. This bed plate 30, which is inclined at an angle preferably of substantially 8°, though this inclination is not to be considered as limitative on the broader aspects of the invention, is provided at its upper surface with parallel, longitudinally extending V-shaped grooves or ways 32 which slidably receive and support complementarily shaped parallel ribs or projections 33 extending longitudinally of the bottom side of a carriage 34. This carriage 34 is formed at the top with a longitudinally extending dove-tailed portion 35, which is slidably received within a dove-tailed way 36 formed in the lower side of a longitudinally adjustable head 37. Longitudinal adjustment of head 37 with reference to carriage 34 is accomplished through a longitudinal screw shaft 38 mounted in the carriage engaging a nut member 39 secured to the underside of head 37 (see Fig. 10), said shaft 38 being rotated through bevel gears 40 and 41 by a shaft 42 journalled in carriage 34 and provided on its outer end with a hand wheel 42a. Head 37 is clamped in position after adjustment on carriage 34 by means of wing-headed screw 44 threaded in the dove-tailed portion of head 37 and engageable with carriage dove tail 36, as indicated in Fig. 4.

Head 37 carries a pair of pillow blocks 50 and 51, arranged for support of a longitudinally extending horizontal shaft 52. Pillow block 50 is provided with tightening screws 53 and 54, the latter of which is provided with a manual handle 56 by which said screw may easily be loosened and tightened to free shaft 52 for rotative adjustment movement and then to set said shaft against such movement. Preferably, shaft 52 is provided with a scale member 58 enabling the angular position of shaft 52 to be conveniently determined, a suitable index or indication mark being provided opposite said scale on member 51.

Mounted on the rearward end of shaft 52 is an electric drive motor 60, arranged with its shaft 61 extending upwardly from the motor. The upper end of this shaft 61 has mounted thereon a belt pulley 62. Tightly mounted on the forward end of shaft 52, forwardly of pillow block 50, is a casting 65 provided with a vertical upwardly extending tubular portion 66 which houses a vertical shaft 67 journalled in and supported by upper and lower bearings 68 and 69 mounted within tubular portion 66. Mounted on the lower end of this shaft 67, which is supported by bearings 68 and 69 with its axis intersecting the axis of shaft 52, is a saw grinding wheel 70 of usual type. This wheel 70 has a central aperture 71 which receives the lower end of shaft 67, and engages at the top against a washer 72 placed around shaft 67 just below bearing 69, a washer 74 placed on the shaft below the grinding wheel being set up by means of a nut 75 screwthreaded on the lower end of shaft 67. The grinding wheel is thus tightly mounted on shaft 67, but may easily be removed for replacement with a different wheel simply by removing nut 75 and washer 74. When the grinding wheel is in place on vertical shaft 67, the plane of its flat upper surface is at the level of the axis of shaft 52. Mounted on casting 65 is a shield or guard 78 surrounding the side and back of the grinding wheel, as clearly shown in Figs. 2 and 3.

Grinding wheel 70 is shaped to grind the teeth of a circular saw by simultaneously engaging the lower edge of one tooth and the upper edge of the tooth next below, having a flat or slightly rounded upper surface 80, a rounded portion 81 merging with surface 80, and a beveled or slightly concaved portion 82 leading from rounded portion 81 to the bottom surface of the wheel. Surfaces 80, 81 and 82 are all precisely shaped to correspond with the desired shape of the notch between teeth, and when the griding is completed, said notches will have the same contour as those surfaces of the grinding wheel. It will be evident that one grinding wheel must be provided for each shape and size of tooth, and that the grinding wheel to be used in any instance must correspond with the saw to be ground.

The upper end of grinding wheel shaft 67 is provided with a pulley 86, which is connected to motor pulley 62 by means of belt 87.

Grinding wheel 70 is thus driven through belt 87 from electric motor 60. The angle of cut may be varied by rotating shaft 52, which carries the grinding wheel support on one end and the driving motor on the other. Since the axis of shaft 52 intersects the axis of shaft 67, and also is located in the plane of the upper surface of grinding wheel 70, such rotation of shaft 52 varies the angle of cut without swinging the grinding wheel substantially from side to side.

The carriage 34 carrying the grinding wheel and its drive motor is reciprocated on bed plate 30 between the position of Fig. 1, in which the grinding wheel is in cutting or grinding relation to the saw, and the position indicated in dotted lines in Fig. 2, in which the grinding wheel is fully retracted and the saw advancing mechanism, later to be described, is in inoperative relation to the saw, by the following mechanism. Secured to the underside of carriage 34 is a depending bracket 90, to which is pivotally connected the forward end of a connecting rod 91, the rearward end of which is driven by a crank pin 92 carried by a crank 93 mounted on a rotatable shaft 94 journalled in ball bearings 95 and 96 supported on frame members 19 and 19a. On the outer end of shaft 94 is a large belt pulley 97, connected by a belt 98 with a smaller pulley 99 on a shaft 100 journalled in bearings at 100 and 101a (Fig. 3) mounted on the lower portion of the frame. On the opposite end of shaft 100 is a large pulley 102, connected by a belt 103 with a small pulley 104 on a shaft 105 driven by an electric motor 106. The described pulleys and belts between electric drive motor 106 and shaft 94 operating crank 93 are of such ratios as to drive said crank and the grinding wheel carriage at a suitably reduced speed. It will be evident that the grinding wheel carriage, being driven by a crank, will move between the described limiting positions with harmonic motion.

The circular saw to be ground is indicated in the drawings at S. This saw is supported in operative relation to grinding wheel 70, and to the saw advancing mechanism later described, by the following means. A bracket 112 extends forwardly from a plate or flange 113 secured to frame member 17 and upright 23, as by screws 114. The forward end of this bracket arm 112 is formed with a vertically disposed supporting plate 115, having a dove-tailed portion 116 which is received within a dove-tailed way 117 formed in the rearward side of a vertically slidable supporting member 118. Supporting member 118 is supported in vertically adjusted position with reference to plate 115 by means of a vertical screw member 120, the upper end of which engages the lower end of member 118, this screw being screwthreaded in a bracket 121 extending from the lower end of plate 115. The lower end of said screw 120 is provided with a hand wheel 122 for convenience of adjustment. Thus manipulation of hand wheel 122 elevates or lowers supporting member 118 which slides vertically on plate member 115.

Secured to the forward side of supporting member 118 is a horizontally extending plate or arm 126, and horizontally slidable on this arm 126 is a saw supporting member 127. For instance, as shown best in Figs. 3 and 7 the rearward side of member 127 is provided with a way 128 engaging the upper and lower longitudinal edges of plate or arm 126. Member 127 is adapted to be set in horizontally adjusted position on supporting arm 126 by means of a screw 130 threaded in member 127 and engaging at its inner end against arm 126, the outer end of screw 130 carrying a manually operable clamp arm 131.

Thus saw supporting member 127 is horizontally slidable on arm 126, and is set tightly thereon by movement of clamp arm 131, while member 118 carrying arm 126 is vertically slidable on member 115, and is adjustable in position on the latter by manipulation of hand wheel 122.

Circular saw S, which is provided with a central aperture 140, goes on over a stub shaft 141 screwthreaded into member 127, as clearly shown in Fig. 7. The aperture 140 in the saw is of a diameter larger than shaft 141, and a conical follower member 142 is moved on over the outer end of shaft 141 after the saw engages within aperture 140, as illustrated in Fig. 7. This conical member 142, after its adjustment on shaft 141, is set up on said shaft by means of a set screw 143. The inner side of the saw engages against the heads of a pair of adjustable screws 144 screwthreaded into member 127 to one side of shaft 141, and at the other side of shaft 141 engages against a shoe 146a on the outer end of a supporting shaft 146 adjustably mounted in a split boss 147 formed on bracket arm 112 and provided with a clamp screw 148, the latter preferably being provided with a manually operable arm 149. It is of course desirable to aline the plane of the saw with reference to the grinding wheel axis, and since saws are not all of the same thickness, the described supporting means has been so designed that saws of different thicknesses may be adjusted to aline properly with the center of the grinding wheel. This adjustment is made simply by adjustment of screws 144 in member 127 and the position of shaft 146 in boss 147, conical member 142 being set up on shaft 141 after such adjustment has been made. Conical member 142, which centers the saw on shaft 141, is of course set up sufficiently tight to support the saw firmly against screws 144 and supporting shaft 146, but not with such tightness as to prevent the saw from being advanced tooth by tooth by the feeding mechanism.

To steady the saw, and to prevent it from undesirable rotation between engagements by the feeding mechanism, it is engaged on its outer surface, at a point opposite shoe 146a, by a similar shoe 160 formed on the lower end of a lever 161 pivoted at 162 on bracket arms 163 extending forwardly from a vertical supporting member 164 formed integrally with and extending vertically from the aforementioned shaft 146. The upper end of this lever 161 has screw-threaded therein an adjustment screw 170 which engages at its inner end against a flat spring 171 mounted on a boss 172 formed on member 164. This spring is engaged between screw 170 and boss 172, on its side opposite to that engaged by screw 170, by a screw 174 screwthreaded in member 164. When screws 170 and 174 are properly set up against spring 171, said spring acts on lever 161 to press shoe 160 into frictional engagement with the outer surface of the saw.

An oscillating pawl 180 is provided for intermittently engaging and advancing the saw alternately with intermittent engagement of the saw by the grinding wheel. This pawl, which is arranged below the grinding wheel, and moved upwardly and forwardly to engage the saw, is provided with a forwardly curved upper end portion 180a adapted to engage in the notches between successive saw teeth t, and the arrangement is such that on each stroke the pawl engages under the tooth which has just been ground.

Pawl 180 is pivotally mounted near its lower end, as at 182, on the outer end of one arm 183 of a bell crank 184, the latter having a hub 184a (see Fig. 5) tightly mounted on a horizontal shaft 185 mounted for rotation in bearings 186 and 187 supported on frame members 28 and 28a, respectively. Formed integrally with and extending upwardly from bell crank hub 184a is an arm member 188 of the bell crank. Extending through and screwthreaded in this bell crank arm 188 is a wing-headed screw 189, the end of which engages and positions the flange 190 of an arm 191 of angle cross section, the latter being formed integrally with and extending upwardly from a sleeve 192 mounted for rotation on shaft 185 between bell crank hub 184a and bearing 186. As clearly shown in Fig. 5, this arm 191 is positioned adjacent arm 188, its flange 190 extending in front of arm 188 to be engaged by positioning screw 189. The distance between arm flange 190 and arm 188 is thus adjustable by manipulation of screw 189. Screw 189 and arm flange 190 are held in engagement with one another by means of a tension spring 196 connected between an arm 197 extending from arm flange 190 and a pin 198 extending from the head of a stud 199 set in arm 188.

Arm 191 has so far been described simply as an arm which is angularly adjustable on shaft 185 with reference to bell crank arm 188. This arm 191, however, is to be considered as an adjustable arm of bell crank 184, the two arms 183 and 191 of the bell crank thus being angularly adjustable with reference to one another on supporting shaft 185.

Bell crank arm 191 lies rearwardly and in the path of movement of a roller 200 mounted on a stud 201 which extends from the lower end of a bracket 202 secured, as by screws 203, to the under side of carriage 34 and spaced forwardly of the aforementioned bracket 90 (see Fig. 4). When the carriage moves in a rearward direction to withdraw the grinding wheel from cutting engagement with the saw, this roller 200 engages bell crank arm 191 and swings the bell crank in a clockwise direction to elevate pawl 180 toward and into feeding engagement with the saw. As here shown, stud 201 carrying roller 200 is provided with a reduced screw-threaded portion 205 which extends through a slot 206 in the lower end of bracket 202, so that the stud and roller carried thereby may be adjusted longitudinally of the carriage, the stud being clamped in position after adjustment by means of a nut 207 screwed on its rearward end and set up against the rearward side of bracket 202.

On the forward movement of the carriage, bell crank 184 is returned by means of a tension spring 216 connected between the lower end of an arm 217 extending downwardly and forwardly from the lower end of pawl 180, below pivot connection 182, and a mounting 218 which is vertically slidable for adustment purposes on a vertical supporting rod 219 connected between frame members 15 and 17, mounting 218 being set in adjusted position on rod 219 by means of a set screw 220. Arm 217 and spring 216, as well as pawl 180, are all in the plane of the saw, affording a straight-pull on the pawl by spring 217. This is of considerable importance, in that it reduces wear on the edges of the pawl at its pivotal mounting, such as otherwise soon becomes sufficient to interfere with accurate action of the pawl. After pawl 180 has moved clear of the saw and of the path of movement of the grinding wheel, bell crank 184 comes into engagement with a stop plate 211 mounted for vertical adjustment on front end frame member 17, thus arresting retractive movement of the pawl in the position of Fig. 1, while the carriage moves on to its fully advanced grinding position.

Located forwardly of pawl 180 and between its upper forwardly curved end 180a and its pivotal mounting of 182 is a fulcrum roller 225 which engages and guides said pawl throughout its stroke. This roller 225 is mounted on a stud 226 mounted in turn on a supporting arm 227, the latter being pivotally mounted intermediate its ends, as at 228, on a supporting arm 229 extending from frame member 224, the lower end of arm 227 being furnished with an adjustment screw 230 which engages frame member 17. It will be evident that adjustment of screw 230 adjusts the position of fulcrum roller 225 about pivots 228 as a center. Roller 225 is also adjustable in position longitudinally of its supporting arm 227 by placement of stud 226 in different apertures 226a drilled in longitudinally spaced relation along the upper end of arm 227.

The operation of the machine as now described is as follows: The circular saw to be ground is placed on over stud 141 and positioning screws 144 and shaft 146 are adjusted to aline the saw with the center of the grinding wheel in the manner previously described, after which conical supporting member 142 is properly set up, and the pressure exerted by shoe 160 under the influence of spring 171 is adjusted by means of screws 170 and 174. The saw is then placed in proper relation with reference to grinding wheel 70 by horizontal adjustment of supporting member 127 on arm 126, and vertical adjustment of supporting member 118 on member 115. It will be evident that the extent of horizontal and vertical adjustments provided is sufficient to accommodate circular saws of a considerable range of diameters.

The extreme advanced position of the grinding wheel may then be adjusted by placing carriage 34 in its extreme forward position (Fig. 1), and then adjusting head 37 on carriage 34 by means of hand wheel 42. The angle of cut may be adjusted at this time by manipulating screw 54 to free shaft 52 for rotation, then adjusting the angle of the grinding wheel by rotation of said shaft, and thereafter clamping the shaft with the grinding wheel in the position desired.

Neglecting the adjustments of the stroke of saw feeding pawl 180 for the time being, the operation of the machine may now be described. Assuming the machine to be in the position of Fig. 1, in which carriage 34 and grinding wheel 70 are in their most advanced position, motor driven crank arm 93 acts through connecting rod 91 to move the carriage and grinding wheel rearwardly in a downwardly inclined direction, depending upon the angle of inclination of the bed plate. In the present preferred embodiment of the machine, this angle is approximately 10°, which is typical and suitable, though of course variation from this angle may be permissible in certain instances.

As crank driven arm 91 thus retracts the carriage, roller 200 carried by the carriage finally engages bell crank arm 191, and swings the bell crank in a right-handed direction, thereby elevating pawl 180 against the resistance of its spring 216 toward the saw. As will be evident from a consideration of Fig. 1, there is sufficient spacing between roller 200 and bell crank arm 191 when the parts are in the extreme advanced position of the machine that such engagement between roller 200 and arm 191 does not occur until grinding wheel 70 is well clear of the saw. When roller 200 finally engages and moves arm 191, however, pawl 180 is elevated by bell crank arm 183 toward the saw, the pawl first rising and then swinging forwardly about the fulcrum roller 225 until the tip of its forwardly curved upper end 180a is in engagement with the saw tooth t which has just been ground by wheel 70. This position is shown in full lines in Fig. 2.

Further rotation of crank 93 withdraws the carriage to the extreme retracted position indicated in dotted lines in Fig. 2, roller 200 swinging bell crank 184 further in a right-handed direction to elevate pawl 180 on up to the position indicated in dotted lines in the figure, thus advancing the saw a distance corresponding to one saw tooth.

As crank driven arm 91 then returns the carriage toward its forward position, pawl 180 is returned downwardly by means of its spring 216, bell crank arm 191 remaining in engagement with roller 200 until bell crank arm 183 engages stop member 211. Pawl 180 and its actuating mechanism have then been returned to the position shown in full lines in Fig. 1, allowing the carriage and grinding wheel to advance still further into grinding relation with the saw, as to the original position of Fig. 1.

It will be evident that the stroke of saw feeding pawl 180 must be very accurately adjusted. Such adjustment is secured by adjustment of the position of fulcrum roller 225, both by adjustment of supporting arm 227 about its pivot 228, and by adjustment of said roller longitudinally of arm 227. The stroke of the pawl, as well as the time at which the pawl begins to be elevated, depends upon the adjusted position of roller 200 in carriage bracket 202, and also upon the adjustment of bell crank arm 191 with reference to bell crank arm 183.

A further important adjustment is the adjustment of the tension of pawl return spring 216. When a saw of coarse teeth is in the machine, the tension of this spring 216 may be considerably greater than when a fine tooth saw is in the machine. In the latter instance, if the spring pressure is too great, the friction of the retracting pawl on the saw teeth is apt to disturb the position of the saw, which has been accurately located by the forward stroke of the pawl. The tension of the pawl return spring is accordingly always so adjusted as to return the pawl positively but without disturbing the position of the saw.

Damage to the points of the saw teeth as the grinding wheel is moved into engagement with the saw is avoided by mounting the carriage to move the grinding wheel in toward the saw at an upward inclination, so that the upper surface of the wheel cannot engage the saw tooth until just as the wheel reaches its fully advanced position.

The machine is not subject to increasing inaccuracy as wear occurs between the bed plate and the carriage. As any such wear occurs on the V-shaped bearing surfaces between the bed and carriage, the carriage simply settles slightly lower on the bed, but its precision of movement is unaffected. Moreover, because of the incline of the bed on which the carriage slides, any play of the carriage on the bed is taken up since the carriage will always assume the lowest possible position on the inclined bed, thereby assuring that the grinding wheel carried by the carriage will be brought up precisely to the same position on each forward stroke of the carriage.

The machine as disclosed is capable of adjustment to a wide range of saw diameters and tooth sizes, and has been successfully used with saws from three inches to sixty inches in diameter, and with tooth sizes from twelve teeth per inch to one tooth per two inches. Moreover, the machine may be adjusted to advance the saw a multiple of one tooth per inch. For example, alternate teeth of some saws must be ground to different angles. The saw feeding mechanism of the machine is in such an instance adjusted to advance the saw a distance equal to two teeth on each stroke. Every other tooth of the saw is then ground with the grinding wheel set at the angle proper for those teeth, after which the grinding wheel is adjusted to the angle proper for the remaining teeth and the wheel advanced two teeth at a stroke to grind said remaining teeth.

I have now illustrated my invention by way of reference to one present specific embodiment thereof, it being understood, however, that this is for illustrative purposes only, and that various changes in design, structure and arrangement may be made without departing from the spirit and scope of the invention or of the appended claims.

I claim:

1. In a circular-saw grinding machine, the combination of means for supporting a circular saw for rotation on a horizontal axis, a rotatable saw grinding wheel, a carriage supporting said rotatable grinding wheel, said carriage being reciprocable toward and from the saw, means for rotating the grinding wheel, means for reciprocating the carriage to move the grinding wheel into and retract it from engagement with the saw, a feeding pawl operating in the plane of the saw and adapted to engage and move the saw, a pivoted bell crank, a pivotal connection between one arm of said bell crank and the rearward end of said pawl, means on the carriage adapted to engage the other arm of said bell crank during movement of the carriage from the saw, whereby the bell crank is swung to move the pawl to feed the saw, and means acting to return said pawl and bell crank to a position out of engagement with the saw upon movement of the carriage toward the saw, said means comprising an arm on the pivoted rearward end of the pawl extending from the pawl in the plane of the saw, and a tension spring attached to said arm and acting on said arm along a line which is also in the plane of the saw.

2. In a circular-saw grinding machine, the combination of means for supporting a circular saw for rotation on a horizontal axis, a grinding wheel carriage reciprocable toward and from the saw along a line parallel to the plane of the saw, a rotatably adjustable shaft on the carriage disposed with its axis substantially in the plane of the saw and at an acute angle to the direction of carriage movement, a grinding wheel support carried by the end of said shaft nearest the saw, a rotatable grinding wheel carried by said support with its axis of rotation in a plane at right angles to said shaft, an electric motor carried by said shaft, a driving interconnection between said electric motor and said grinding wheel, and saw advancing means engageable with the saw alternately with the carriage-supported grinding wheel.

3. In a circular-saw grinding machine, the combination of means for supporting a circular saw for rotation on a horizontal axis, a grinding wheel carriage reciprocable toward and from the saw along a line parallel to the plane of the saw, and which inclines downwardly from the saw, a stationary bed for said carriage having V-shaped guide ways extending parallel to the line of carriage movement, the under side of said carriage being formed with projections having bearing surfaces complementary to and slidably supported by the V-shaped guide way surfaces of the bed, a head longitudinally adjustable on said carriage on a horizontal line parallel to the plane of the saw, a grinding wheel carried by said longitudinally adjustable head and rotatable on its axis in a plane at right angles to the plane of the saw, means carried by said head for rotating said grinding wheel, and saw advancing means engageable with the saw alternately with the carriage-supported wheel.

4. In a circular-saw grinding machine, the combination of means for supporting a circular saw for rotation on a horizontal axis, a grinding wheel carriage reciprocable toward and from the saw along a line parallel to the plane of the saw, a head adjustable on said reciprocable carriage along a direction line parallel to the plane of the saw and making an acute angle with the direction of carriage travel, a grinding wheel rotatably mounted on said head on an axis which is in a plane at right angles to the plane of the saw and at right angles to the direction of adjustment movement of said head on said carriage, and also adjustably rotatable in said plane on an axis parallel to the direction of adjustment movement of the head, means for rotating said grinding wheel, and saw advancing means engageable with the saw alternately with the grinding wheel.

WILLARD H. THURSTON.